United States Patent
Skrabs

(10) Patent No.: US 6,663,531 B2
(45) Date of Patent: Dec. 16, 2003

(54) METHOD FOR ASSEMBLING A PLANETARY GEAR UNIT IN A PRECISE POSITION

(75) Inventor: Alfred Skrabs, Sitterswald (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/204,885

(22) PCT Filed: Mar. 17, 2001

(86) PCT No.: PCT/EP01/03075
§ 371 (c)(1), (2), (4) Date: Aug. 22, 2002

(87) PCT Pub. No.: WO01/71221
PCT Pub. Date: Sep. 27, 2001

(65) Prior Publication Data
US 2003/0036456 A1 Feb. 20, 2003

(30) Foreign Application Priority Data
Mar. 23, 2000 (DE) .......... 100 14 464

(51) Int. Cl.⁷ .......... F16H 57/08; B32P 19/04
(52) U.S. Cl. .......... 475/348; 29/460
(58) Field of Search .......... 29/460; 74/530; 475/331, 335, 348

(56) References Cited

U.S. PATENT DOCUMENTS

| | | | |
|---|---|---|---|
| 3,667,324 A | 6/1972 | Laing | 74/801 |
| 4,043,021 A | 8/1977 | Mosbacher et al. | 29/437 |
| 4,468,985 A | 9/1984 | Nilsson | 74/801 |
| 5,643,126 A * | 7/1997 | Hotta et al. | 475/348 X |
| 5,658,215 A | 8/1997 | Premiski et al. | 475/331 |
| 5,702,320 A * | 12/1997 | Brassai et al. | 475/331 X |
| 5,910,066 A | 6/1999 | Schulz et al. | 475/336 |

FOREIGN PATENT DOCUMENTS

| | | | |
|---|---|---|---|
| CH | 415 215 | 12/1966 | |
| DE | 1 400 991 | 9/1970 | F16C/21/00 |
| DE | 2 024 469 | 9/1974 | F16H/57/08 |
| DE | 74 01 523 | 5/1975 | F16H/57/08 |
| DE | 25 03 518 | 11/1976 | F16H/57/08 |
| DE | 28 50 099 | 5/1979 | F16H/37/02 |
| DE | 43 25 295 A1 | 2/1995 | F16H/1/28 |
| DE | 195 10 499 A1 | 9/1996 | F16H/1/36 |
| EP | 0 688 976 A1 | 12/1995 | F16H/57/08 |
| GB | 949987 | 2/1964 | |
| GB | 1015278 | 12/1965 | |
| GB | 2 182 753 A | 5/1987 | F16H/57/08 |
| JP | 62236633 | * 10/1987 | 29/460 |
| JP | 3258426 | * 11/1991 | 29/460 |
| JP | 5169164 | * 7/1993 | 29/281.1 |
| JP | 05-215190 A | 8/1993 | F16H/1/28 |

* cited by examiner

Primary Examiner—Roger Pang
(74) Attorney, Agent, or Firm—Davis & Bujold, PLLC

(57) ABSTRACT

The method for precise position assembling a planetary gear unit consisting of a planetary gear, a planet shaft, a bearing, two thrust washers and two guide washers, especially for use in a planetary transmission for an automatic transmission of a motor vehicle consists in that the planetary gear unit is inserted within mean position tolerance, aligned and braced in a tool which tool has two displaceable stamps and two jaws with indented rings which jaws surround the stamps forming a ring and can be displaced independently of the stamps. By closing the tool, the indented rings clamp the guide washers until a constant pressure is exerted against them. The stamps are pressed against the ends of the planet shaft until they are forged.

1 Claim, 1 Drawing Sheet

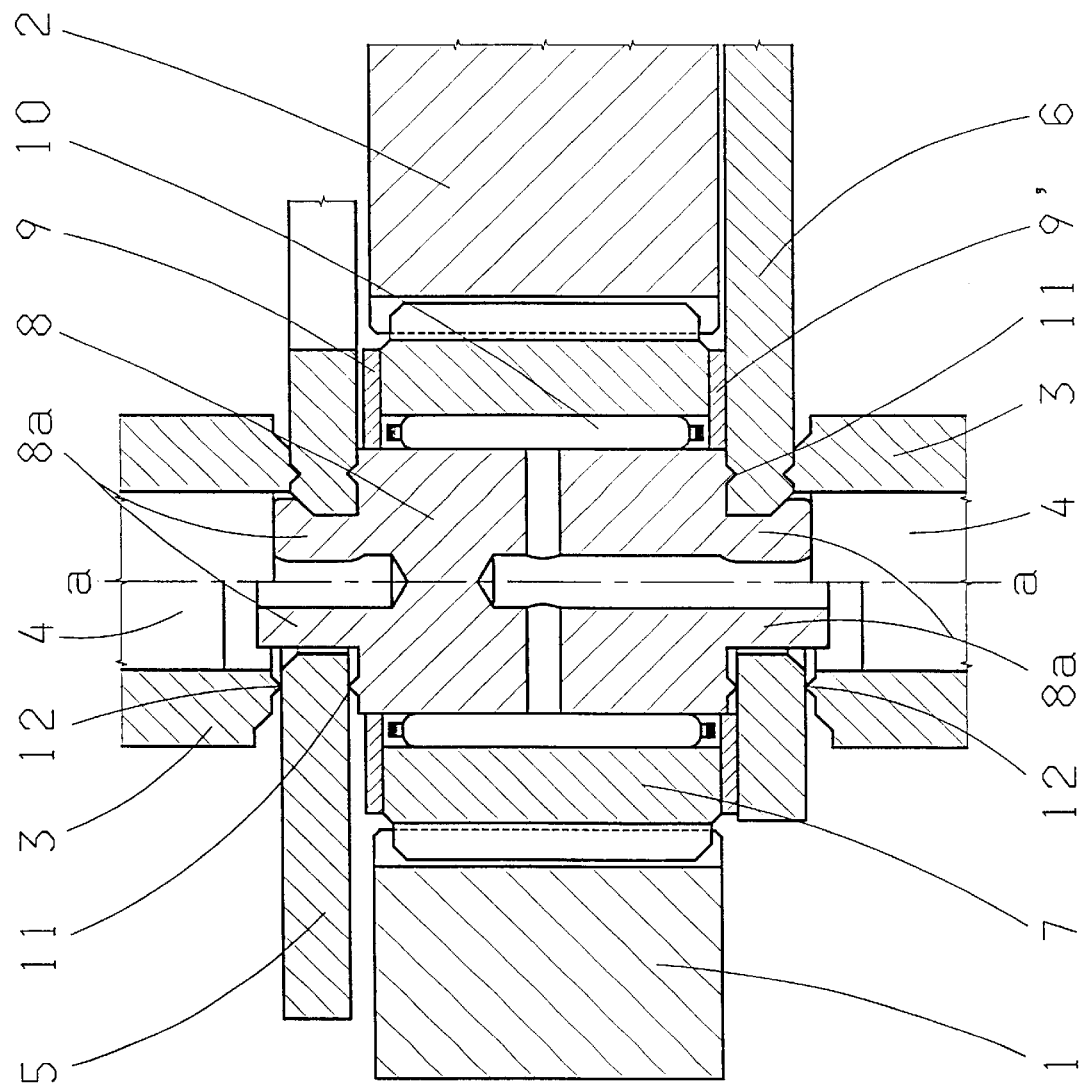

METHOD FOR ASSEMBLING A PLANETARY GEAR UNIT IN A PRECISE POSITION

The invention relates to a method for assembling in a precise position a planetary gear unit which comprises a planetary gear, a planet shaft with pegs on the front sides, a bearing inserted between planet shaft and planetary gear, two thrust washers and two guide washers and is to be used in a planetary transmission having one sun gear and at least one ring gear.

Many problems posed in the driving technology such as in motor vehicle transmissions demand the implementation of extreme ratios. Planetary transmissions are especially well suited to combine high ratios with a compact construction. As example of this let there be cited the so called Wolfrom coupling transmission which, at a high ratio, has great efficiency. As Wolfrom transmission is designated a specially simple coupling transmission. The drive shaft is connected with a sun gear which interacts with a planetary gear block. The planetary gear rests on an internally toothed ring gear which is fixedly connected with the housing, the web following idly as planet carrier. The movement is relayed via the planet carrier and the planetary gear is designed, for example, as stepped planet. The planetary gear meshes for its part again with a second internally toothed ring gear which forms the output.

Such a planetary transmission is adequate for a compact design which makes a great transmission densities on narrow space possible.

Especially in the handling technology, a transmission of high ratios is needed for power transmission of high speed prime movers. These transmissions must have small torsional play during load direction change. They must further stand out by a torsion-proof, light and compact design.

The Applicant's DE A 195 10 499 has disclosed a planetary transmission having a driven sun gear, a first and a second respectively internally toothed ring gears of which the first is fixedly and the second can be notably driven and forms the output and having planetary gears supported upon axles that extend inclined in a planet carrier so as to be constantly meshed with the sun gear and the ring gear. The planetary gears are designed as stepped planets with small and large stepped gears, the toothings of the stepped gears having different modules.

The Applicant's DE A 43 25 295 has made known one other planetary transmission with a driven sun gear and two internally toothed ring gears. In the planetary transmission, the axles supported on planetary axles in the planet carrier are disposed inclined forming an acute angle with a central axle of the planetary transmission. The planet carrier which, here follows idle, is supported with low friction upon a bushing via a ball bearing, the bushing abutting at one end, via a shoulder, on a ball bearing for adjusting the axial position of the planet carrier and, via a guard ring, can be fixedly fastened on a spacer disc.

Hereby is provided a planetary transmission free of play in which the precision is great that can be achieved in the production, which forms the basis for a tight play adjustment.

An essential part of a planetary transmission is the above mentioned planetary gear unit consisting of a planetary gear, a planet shaft, for example, with pegs on both front sides, a bearing inserted between the planet shaft and the planetary gear, two thrust washers and two guide washers and which serves for use in the planetary transmission. During the production process, there have to be made precise position planet holes with special precision spindle machines, the holes having to be processed first by prior spindling and thereafter by finishing spindling. A very high expenditure is needed to meet the tolerance requirements relative to axle inclination, axle offset, diameter tolerance and uniform cord volume. This means a great investment for special precise spindling machines, the preparation of expensive tools for the prior and finishing spindling the use of which demands considerable time, the same as the subsequently required removal of ridges and the subsequent test step. In order to ensure steps that guarantee high quality in the production process, a high production cost is accordingly needed, particularly of automatic transmission for motor vehicles.

The problem on which this invention is based is to proposed, for assembly with position precision a planetary gear unit mentioned above, a method with which the production can be carried out in a single reshaping working cycle.

On the basis of a method of the kind specified above, said problem is solved by the features stated in the claim.

According to this invention, it is proposed that the reshaping working cycle comprises the following steps:

the planetary gear unit is inserted via the ring gear and the sun gear in mean position tolerance, aligned and braced in a tool;

the tool, which has two stamps displaceable coaxially to the planet shaft and opposite to the two front sides thereof and two jaws with indented rings which jaws surround the stamps in the form of a ring and can be displaced independently of the stamps, closes until the indented rings abut on the guide washers and clamp them;

the tool closes further until the indented rings exert a constant pressure upon the outer sides of both guide washers; and the stamps are pressed against the ends of the planet shaft with a force such that they are forged and thereby connect with position precision, positively and without play the appertaining guide washers with the planet shaft.

By virtue of this reshaping working cycle practicable in several steps, no precision spindling is needed any more for producing planetary holes. The planetary holes are here stamped during the precision stamping of the guide washers with play (of about 0.3 mm) relative to the planet shaft pegs.

The inventive simple reshaping working cycle results in a considerable reduction of cost with, at the same time, quality improvement with regard to contact pattern and noises. The planet shafts absorb part of the torque so that the planet carrier becomes more rigid. Depending on the utilization (that is, the required torque), it is completely possible to omit the planet spiders whereby a further saving in cost and weight is made possible.

The distance in the area of the planetary gears is exactly maintained by the shoulders of the planet shaft whereby an improvement in quality is achieved compared to the conventional planetary gear units; besides, the thrust washers do not have any more to be surface ground. The required investments in machines are correspondingly small in new projects.

The invention is explained in detail herebelow with reference to the drawing in which the single FIGURE shows a section through the planetary gear unit during two consecutive inventive steps.

As can be understood from this FIGURE, the planetary gear unit 7 has a planet shaft 8 with pegs 8*a* on both its front faces, a bearing 10, for example, a needle bearing, inserted between the planet shaft and the planetary gear, two thrust washers 9, 9' and two guide washers 5, 6. With 1 is designated the ring gear of the appertaining planetary transmission and with 2 and (expanding) sun gear.

The planet shaft 8 forms upon both its front sides, between its outer wall and the outer wall of the planetary peg 8, shoulders upon each of which an indented ring 11 is formed. The indented rings are arranged concentrically to the longitudinal axis a—a of the planet shaft. A conventional bearing 10, especially a needle bearing, is inserted between the planet shaft 8 and the planetary gear 7.

To carry out the inventive reshaping working cycle when assembling with position precision, the planetary gear unit comprised of planetary gear, planet shaft, the bearing and the two thrust washers, a tool especially made, therefore, is required which has on each of the areas facing the guide washers 5, 6 one annular jaw 7, there being provided on each jaw a stamp 4 displaceable independently thereof. The jaws 3, likewise displaceably supported, have on each of the areas facing the guide washers 5, 6, an indented ring 12 the geometry of which is in essence equal to that of the indented rings 11 upon the shoulders of the planet shaft.

The inventive method for assembling with position precision, this planetary gear unit now consists in that the planetary gear unit is inserted via the ring gear 1 and the sun gear 2 with mean position tolerance, aligned and braced in the tool 3, 4; the tool with the two displaceable stamps 4 coaxial to the planet shaft 8 and opposite to both front sides thereof, the same as the two jaws 3 with indented rings 12 that surround both stamps 4 forming a ring and are displaceable independently thereof, closes until the indented rings 12 abut on the guide washers 5, 6 and clamp them; the tool 3, 4 closes further until the indented rings 12 exert a constant pressure upon the outer sides of the two guide washers 5, 6; the stamps 4 are pressed against the ends of the pegs of the planet shaft with a force such that these are forged and thereby connect with position precision, positively and without play the appertaining guide washers with the planet shaft.

In the representation shown in FIG. 1, to the left of the longitudinal axis a—a is shown the situation prior to the forging step by the stamps 4 and to the right of the line a—a, the situation after the forging step by the stamps 4 has been carried out.

The planetary gear unit aligned, via the ring gear 1 and the expanding sun gear 2 in mean position tolerance with no play, therefore, stretched by the annular jaws of the tool which then closes further and with the indented ring 12, the same as the indented ring 11 formed upon the shoulder of the planet shaft, positively covers the aligned position relative to the guide washers 5, 6. Thereafter the tool closes further until a constant pressure of the indented ring is exerted upon the thrust washers after which the stamps 4 squeeze the pegs 8a of the planet shaft 8 to a preset dimension.

Thereby is positively produced and free of play by the guide washers 5, 6 the planetary gear unit without it being necessary to make planetary holes by precision spindling.

| Reference numerals | |
|---|---|
| 1 | ring gear |
| 2 | sun gear |
| 3 | jaw |
| 4 | stamp |
| 5 | guide washer |
| 6 | guide washer |
| 7 | planetary gear |
| 8 | planet shaft |
| 8a | peg |
| 9 | thrust washer |
| 10 | needle bearing |
| 11 | indented ring |
| 12 | indented ring |

What is claimed is:

1. A precision method for assembling a planetary gear unit having sun gear, at least one ring gear; a planetary gear; a planet shaft with pegs on front sides; a bearing inserted between the planet shaft and the planetary gear; and two thrust washers and two guide washers, which method comprises the following steps:

a) inserting the planetary gear unit aligned and braced in a tool (3, 4) with mean position tolerance via the ring gear (1) and the sun gear (2);

b) closing the tool, which has two displaceable stamps (3) coaxial with the planet shaft (8) and opposite to the two front sides thereof, the same as two jaws (4) with indented rings (12) surrounding the stamps in the form of a ring and displaceable independently of the stamps, until the indented rings (12) abut on the outer sides of the guide washers (5, 6) and clamp them;

c) further closing the tool until the indented rings (12) exert a constant pressure upon the outer sides of both thrust washers; and d) pressing the stamps (4) against the ends of pegs (8a) of the planet shaft (8) with a force such that they are forged and thereby connect with positional precision, positively and without play the appertaining guide washers with the planet shaft.

* * * * *